2,941,010
ACETYLENIC ETHER POLYMERS AND THEIR PREPARATION

David J. Mann, Livingston, Donald D. Perry, Morristown, and Rita M. Dudak, Hibernia, N.J., assignors, by mesne assignments, to Thiokol Chemical Corporation, a corporation of Delaware No Drawing. Filed July 3, 1957, Ser. No. 670,846

10 Claims. (Cl. 260—615)

This invention relates to acetylenic ether polymers, and more particularly to linear polymers containing acetylenic and ether groups.

So far as we are aware, acetylenic ether polymers have not previously been reported.

A principal object of our invention is to prepare acetylenic ether polymers which are useful as intermediates in the synthesis of acetylenic polyurethanes useful as high energy, solid, rocket propellant fuels.

Our invention comprises broadly the condensation polymerization of an acetylenic glycol and a dialkyl acetal.

Since we have employed different species of formals and of acetals in the practice of our invention, hereinafter we ordinarily shall use the term "dialkyl ether" instead of the generic term "acetal"; it being understood that our use of "dialkyl ether" is limited to ethers wherein two alkoxy groups are attached to the same carbon atom.

Our novel process involves heating, in the presence of a strong acid catalyst, an acetylenic glycol, such as 2-butyne-1,4-diol ($HOCH_2C\equiv CCH_2OH$), with a dialkyl ether, such as di-n-propyl formal $$((CH_3CH_2CH_2O)_2CH_2)$$

or di-n-propyl acetal ($(CH_3CH_2CH_2O)_2CHCH_3$). The reaction preferably is carried out in bulk, but it also can be conducted in suspension or in solution using an inert solvent boiling at or above 100° C. (All temperatures recited herein are in degrees centigrade.)

Our preferred catalyst is p-toluene-sulfonic acid; but other catalysts may be employed, including sulfuric, phosphoric and hydrochloric acids.

The mixture of approximately equimolar quantities of reactants and a small amount of the acid catalyst is heated at a temperature in the range from slightly above 100° to about 250°. No significant reaction occurs below 100°. The reaction (with 2-butyne-1,4-diol) proceeds as follows:

$nHOCH_2C\equiv CCH_2OH+n(R_2O)_2CHR_1+catalyst \longrightarrow$

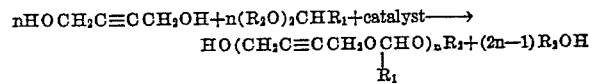

where $R_1$=hydrogen or alkyl, and $R_2$=alkyl.

In order to shift the equilibrium point in the direction of a completed reaction, and to favor polymer formation, the alcohol formed must be removed from the reaction system. This can be done by distilling the alcohol off at atmospheric pressure or under reduced pressure, or by using a combination of both techniques. In practice both methods were employed; most of the alcohol being removed by distillation at atmospheric pressure, while the last traces were eliminated by heating in vacuo.

Although temperatures from 100° to 250° can be used, the best results were obtained in the range from 125° to 150°. This latter range insured completeness of reaction through removal of all of the alcohol formed; and yet it did not cause appreciable thermal degradation of the polymer.

The reaction products are liquids or low-melting solids. The polymers prepared from the dialkyl formals (where, as in the foregoing equation, $R_1$=H) are solids; while those prepared from other dialkyl ethers—where $R_1$=n-alkyl—are liquids. Their structures have been confirmed by elemental analysis, by infrared spectra and by heat of combustion determinations. The latter values were compared with those calculated, and were found to give excellent agreement.

The following examples are cited by way of illustration only, and are not intended to limit the method to any of the steps, quantities or other conditions recited therein.

Example I (A) Poly(2-butyne-1,4-dioxymethylene): A three-necked, round-bottom flask, fitted with a gas inlet tube, a mechanical stirrer and a graduated Dean-Stark moisture trap with a condenser attached, was charged with 66 parts of di-n-propyl formal, 45 parts of 2-butyne-1,4-diol and 0.5 part of p-tolene-sulfonic acid. A slow stream of nitrogen was passed through the system via the gas inlet tube to aid in entrainment of the by-produced alcohol, and the mixture was heated in an oil bath. When it became sufficiently fluid, the mixture was stirred mechanically and was heated for two to three hours at 125° to 150°. During this time 60-70 ml. of n-propanol were distilled into the Dean-Stark trap. The mixture then was heated for another three hours under reduced pressure (1 to 3 mm.). Traps cooled with Dry Ice and acetone were placed in the system to collect any additional alcohol formed in the reaction. An additional 5 to 15 ml. of n-propanol were isolated during this heating cycle. The reaction mixture then was allowed to cool. The product, a waxy solid, weighing 46 grams, melted at 60°, represented a 90 percent yield. Its molecular weight—calculated from the freezing-point depression of ethylene bromide as a solvent—was 680.

(B) An experiment, in which the same reactants and substantially the same procedure were used as in (A) next above—except that polyphosphoric acid was the catalyst, and a longer reaction time (9 hours) and higher temperature (130°-180°) were employed—resulted in a quantitative yield of a polymer in the form of a dark brown, waxy solid, M.P. 55°, with a molecular weight of 1020 (determined cryoscopically).

(C) When 2-butyne-1,4-diol and di-n-butyl formal were reacted in similar manner at temperatures up to 190°, in the presence of a catalytic amount of p-toluenesulfonic acid, nearly two equivalents of n-butanol distilled off. The product was a mushy, light brown solid, of molecular weight 475, when determined cryoscopically in a benzene solution.

Example II (A) Poly(2-butyne-1,4-dioxyethylidene): A 250 ml., three-necked flask, equipped as in Example I, was charged with 43 parts of 2-butyne-1,4-diol, 73 parts of di-n-propyl acetal, and 0.5 part of p-toluene-sulfonic acid. The mixture was heated at 125° to 150° for three hours at atmospheric pressure, under a slow stream of nitrogen to aid in the entrainment of the by-produced alcohol—during which time 65 ml. of n-propanol were collected. The reaction mixture then was heated for an additional four hours at 1 to 3 mm. pressure; and an added 10 ml. of n-propanol were isolated. The product, obtained in quantitative yield, was a viscous, dark-brown liquid. Its molecular weight was 920 when determined cryoscopically in an ethylene bromide solution.

(B) Another experiment was carried out with 2-butyne-1,4-diol in substantially the same manner as that in Example II (A) next above—except that (1) 1,1-diethoxypropane (the diethyl acetal of propionaldehyde $$CH_3CH_2CH(OC_2H_5)_2)$$

was substituted for the di-n-propyl acetal; (2) the range of temperatures was from 120° to 132°; and (3) the heating time was six hours. The product, obtained in substantially quantitative yield, was a dark-brown, viscous liquid.

Although we prefer to use 2-butyne-1,4-diol as the acetylenic glycol reactant in the practice of our invention, other acetylenic glycols having relatively short-chains for example 4-methyl-2-butyne-1,5-diol and 4-octyne-1,8-diol may be employed.

The aforedescribed linear, acetylenic ether polymers are useful as intermediates in the synthesis of high energy, solid, rocket propellant fuels. For example, such polymers can be reacted with organic diisocyanates, under suitable conditions, to yield chain-extended, cross-linked products possessing the rubbery physical properties needed in a solid propellant fuel; said products and the aforementioned process being the subject of a separate co-pending patent application filed July 1, 1957, Serial Number 669,912. The acetylenic bonds in the polymer units contribute to the high specific impulse which characterizes such fuels when used as rocket propellants.

It is to be understood that various modifications and changes in detail in the aforedescribed means and methods may be made without departing from the spirit of our invention; and that all reactants, quantities and proportions, and process steps and conditions recited hereinabove are intended to be illustrative only, and in no sense limitative of the invention other than as the same is defined in the accompanying claims.

What is claimed is:

1. The method of producing an acetylenic ether polymer which comprises, forming a mixture of approximately equimolar quantities of 2-butyne-1,4-diol and di-n-propyl formal with a catalytic amount of p-toluene-sulfonic acid; causing condensation-polymerization in said mixture by heating the same at a temperature in the range from at least 100° C. to about 250° C. while removing by-produced n-propanol from any unchanged reactants and from the resulting polymer; and isolating said polymer as poly(2-butyne-1,4-dioxymethylene).

2. The method of producing an acetylenic ether polymer which comprises, forming a mixture of approximately equimolar quantities of 2-butyne-1,4-diol and di-n-butyl formal with a catalytic amount of p-toluene-sulfonic acid; causing condensation-polymerization in said mixture by heating the same at a temperature in the range from at least 100° C. to about 250° C. while removing by-produced n-butanol from any unchanged reactants and from the resulting polymer; and isolating said polymer.

3. The method of producing an acetylenic ether polymer which comprises, forming a mixture of approximately equimolar quantities of 2-butyne-1,4-diol and di-n-propyl formal with a catalytic amount of polyphosphoric acid; causing condensation-polymerization in said mixture by heating the same at a temperature in the range from at least 100° C. to about 250° C. while removing by-produced n-propanol from any unchanged reactants and from the resulting polymer; and isolating said polymer.

4. The method of producing an acetylenic ether polymer which comprises, forming a mixture of approximately equimolar quantities of 2-butyne-1,4-diol and di-n-propyl acetal with a catalytic amount of p-toluene-sulfonic acid; causing condensation-polymerization in said mixture by heating the same at a temperature in the range from at least 100° C. to about 250° C. while removing by-produced n-propanol from any unchanged reactants and from the resulting polymer; and isolating said polymer as a poly(2-butyne-1,4-dioxyethylidene).

5. Poly(2-butyne-1,4-dioxymethylene).
6. Poly(2-butyne-1,4-dioxyethylidene).
7. Poly(2-butyne-1,4-dioxypropilidene).
8. A synthetic linear poly(lower alkynyl-dioxyalkane).
9. A synthetic linear poly(lower alkynyl acetal).
10. A synthetic poly(lower alkynyl formal).

References Cited in the file of this patent

UNITED STATES PATENTS

| | | |
|---|---|---|
| 2,071,252 | Carothers | Feb. 16, 1937 |
| 2,469,288 | Adelson et al. | May 3, 1949 |